Jan. 27, 1942.  E. M. MURPHY  2,271,021
FABRIC
Filed Feb. 17, 1941

INVENTOR.
Elsie M. Murphy
BY Brayton Richards
ATTORNEY.

Patented Jan. 27, 1942

2,271,021

UNITED STATES PATENT OFFICE 2,271,021

FABRIC

Elsie M. Murphy, Jamaica Estates, Long Island, N. Y., assignor to S. Stroock & Co., Inc., New York, N. Y., a corporation of New York Application February 17, 1941, Serial No. 379,274

1 Claim. (Cl. 139—412)

The invention relates to improvements in fabrics and has for its primary object the provision of an improved composite fabric of relatively great strength and heat insulating properties.

Other objects will appear hereinafter.

The invention consists of the combinations and arrangements of parts hereinafter described and claimed.

Figure 1:
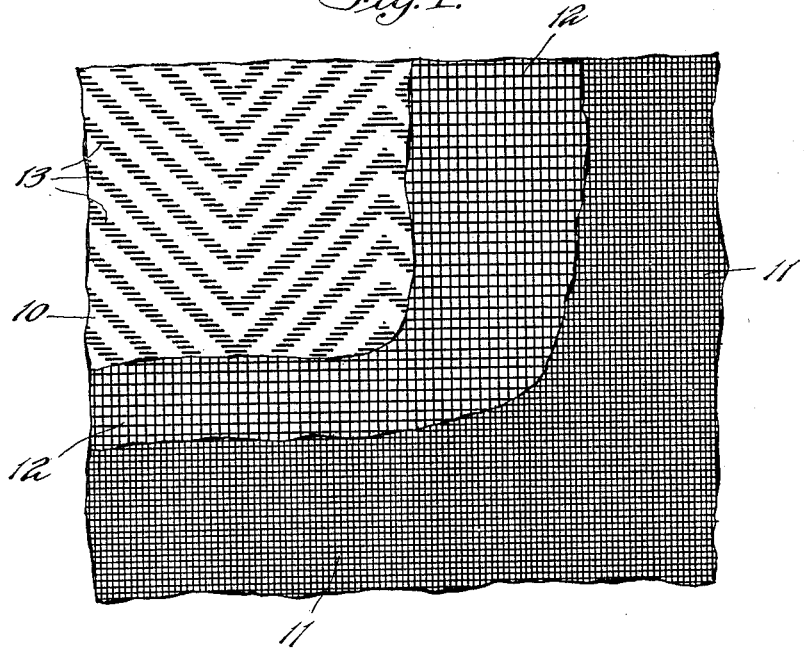
Figure 2:
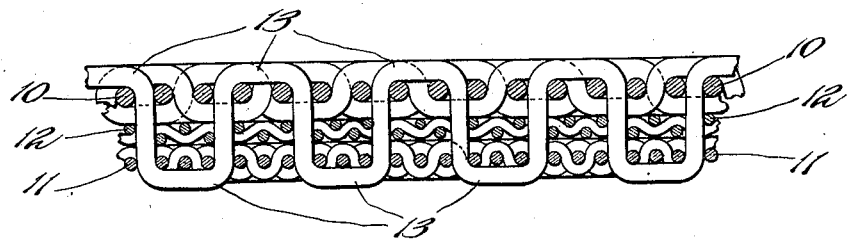

The invention will be best understood by reference to the accompanying drawing forming a part of this specification and in which, Fig. 1 is a face view of a section of fabric with portions broken away to show underlying parts; and Fig. 2 an enlarged section thereof in which the various parts have been greatly exaggerated in size and shown more or less diagrammatically.

The embodiment of the invention illustrated in the drawing comprises superposed layers of woven cloth 10 and 11 having a layer 12, woven of strands formed of spun glass fibers, interposed between them. Certain threads 13 of the cloth layer 10 are extended as indicated through the layer 12 and interwoven in the layer 11 and whereby all said layers are firmly but flexibly secured together to constitute a composite fabric. In this way a composite fabric is provided which has great strength and heat insulating properties.

While I have illustrated and described the preferred form of construction for carrying my invention into effect, this is capable of variation and modification without departing from the spirit of the invention. I therefore do not wish to be limited to the precise details thus disclosed, but desire to avail myself of such variations and modifications as fall within the scope of the appended claim.

I claim:

A composite textile fabric comprising three plies of cloth, each ply comprising two sets of oppositely directed threads, the threads of one set of each ply being closely interwoven with the threads of the other set of the respective ply, the threads of the intermediate ply being of spun glass fibers, and certain of the threads of one outer ply being successively and at spaced intervals passed through the intermediate and the other outer plies at right angles thereto from face to face and over threads of said other outer ply outwardly of at least two threads thereof and then returned through the said other outer and intermediate plies again at right angles thereto from face to face.

ELSIE M. MURPHY.